(12) United States Patent
Beale et al.

(10) Patent No.: US 6,542,121 B1
(45) Date of Patent: Apr. 1, 2003

(54) SENSOR SYSTEM

(75) Inventors: Dean A R Beale, Malvern (GB); Alan P Blake, Malvern (GB); Ian R Slade, Malvern (GB); Keith Trafford, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/914,727

(22) PCT Filed: Feb. 21, 2000

(86) PCT No.: PCT/GB00/00607

§ 371 (c)(1),
(2), (4) Date: Sep. 13, 2001

(87) PCT Pub. No.: WO00/52494

PCT Pub. Date: Sep. 8, 2000

(30) Foreign Application Priority Data

Mar. 3, 1999 (GB) .............................................. 9904749

(51) Int. Cl.[7] .................................................. G01S 5/04
(52) U.S. Cl. .................................. 342/442; 342/357.06
(58) Field of Search ...................... 342/357.01, 357.06, 342/442, 457, 444; 701/213, 215

(56) References Cited

U.S. PATENT DOCUMENTS

| | | | |
|---|---|---|---|
| 5,266,958 A | 11/1993 | Duboraw, III | |
| 5,446,465 A | 8/1995 | Diefes et al. | |
| 5,835,060 A | 11/1998 | Czarnecki et al. | |
| 5,883,598 A | * 3/1999 | Parl et al. | ............... 342/457 |
| 6,243,587 B1 | * 6/2001 | Dent et al. | ............... 455/456 |
| 6,300,903 B1 | * 10/2001 | Richards et al. | .......... 342/450 |
| 6,388,618 B1 | * 5/2002 | Stilp et al. | ............... 342/457 |

FOREIGN PATENT DOCUMENTS

| | | |
|---|---|---|
| DE | 195 12 787 | 9/1996 |
| EP | 0 837 340 | 4/1998 |
| GB | 2 308 033 | 6/1997 |

* cited by examiner

Primary Examiner—Dao Phan
(74) Attorney, Agent, or Firm—Nixon & Vanderhye P.C.

(57) ABSTRACT

A sensor system (10) for locating transmitters incorporates three vehicle-mounted patch antennas (30 to 34), a signal processing unit (40), a navigation unit (50) and a computer (60). The navigation unit (50) measures sensor system position using the Global Positioning System. The antennas (30 to 34) receive radiation from a transmitter (210) to be located and respond by generating output signals which are frequency downconverted and processing coherently by a digital signal processing unit (230). This produces elevation and azimuth phase data for the computer (60), which determines measured phase differences. The computer (60) also calculates expected phase differences from antenna positions and trial transmitter positions. It determines transmitter location from correlation between measured and expected phase differences. The position of a transmitter (210) is determined for a number of sensor system positions.

25 Claims, 9 Drawing Sheets

SENSOR SYSTEM

BACKGROUND OF THE INVENTION

1. Field of the Invention

This invention relates to a sensor system and a method for locating transmitters.

2. Discussion of Prior Art

It is known to locate transmitters with an antenna which is scanned until its signal is a maximum; this gives transmitter bearing relative to the system but not intervening distance. The distance can be determined by two steerable directional antennas of known separation and relative orientation: this gives two different transmitter bearings with a known baseline from which transmitter/system distance can be calculated. It suffers from the disadvantage of requiring two steerable directional antennas, which should ideally be spaced apart by a distance comparable to that between the transmitter and location system. If spurious multipath signals are present, adequate accuracy may not be obtainable.

Pulse-echo target location systems (radar, sonar, lidar) are also well known. They employ directional antennas and determine target distance from pulse time of flight and direction from bearing of peak receive signal. Features in the system field of view reflect interrogating pulses irrespective of whether or not they are transmitters.

In applications such as surveillance, there is a requirement for locating a transmitter to an accuracy of better than 5 m in a cubic space of side 100 m. Current radars and direction finding systems either lack sufficient accuracy or are undesirably expensive and complex, and can be difficult to mount on moving platforms of convenient size, eg road vehicles or aircraft.

U.S. Pat. No. 5,835,060 to Czarnecki et al discloses a long base line interferometer system for transmitter location. The system employs antennas at each end of the base line and measures phase differences between antenna output signals at successive positions along a system movement path between 2 m and 100 m long. Discontinuities in phase measurement are removed by "unwrapping", ie addition or subtraction of $2\pi$ to produce phase values between $\pi$ and $-\pi$. To remove an unwanted unknown phase constant, each successive measured phase difference is subtracted from the next along the measurement path to give a difference of differences or differential. Differentials are also predicted, for grid points being searched. Predicted differentials are then subtracted from measured equivalents to produce residuals; a cost function is then derived which is the sum of the squares of the residuals reduced to their principle value. The cost function with the lowest value is the starting point for non-linear least squares convergence to obtain a value for transmitter position, which can in turn be used as a new starting point for a further iteration. Unfortunately, this technique is sensitive to noise; moreover, as will be described later in more detail, simulation indicates that it is not sufficiently accurate, particularly at low signal to noise ratios.

It is an object of the invention to provide an alternative form of sensor system.

SUMMARY OF THE INVENTION

The present invention provides a sensor system for transmitter location incorporating:

a) two receiver elements responsive to incident radiation by generation of respective signals, b) a processing system for determining phase difference data for pairs of element signals, c) means for measuring sensor system position in terms of position data;

d) computer apparatus for determining transmitter position from phase difference data measured from processed element signals and calculated from trial transmitter locations, characterised in that the computer apparatus is arranged to locate transmitters from magnitude or phase of circular functions of differentials between measured and calculated phase difference data.

The invention provides the advantage that because circular functions are used it is not necessary to alter phase values by $2\pi$ or to calculate iteratively. Instead location is obtained directly. Moreover, simulation indicates that improved accuracy and noise immunity is obtained compared to the prior art.

The processing system may be arranged to process a pair of element signals or a pair of frequency downconverted signals equivalent thereto by multiplying one signal of each pair in either case by a complex conjugate of the other to enable their phase difference to be measured. It may be arranged to determine phase difference by:

a) mixing each signal of a pair with sine and cosine reference signals to determine in-phase and quadrature components, b) multiplying each component of one signal by both components of the other to produce an in-phase component product, a quadrature component product and two products of in-phase and quadrature components, c) adding the in-phase component product to the quadrature component product, and d) subtracting one product of in-phase and quadrature components from the other.

The processing system may be arranged to digitise signals at a sampling rate prior to mixing with reference signals, the reference signals have a frequency of one quarter of the sampling rate, and mixing is implemented by multiplication of alternate samples by and one other sample in four by $-1$.

The circular functions of differentials between measured and calculated phase difference data may be complex exponents, and the computer apparatus may be arranged to determine actual transmitter location by summing exponents over a range of system positions and to indicate transmitter location from the magnitude or phase of this summation. The computer apparatus may alternatively be arranged to determine actual transmitter location by producing summations of the exponents over a range of system positions, to multiply the summations together to form a product and to indicate transmitter location as that corresponding to a predetermined magnitude or phase of this product.

The measuring means may comprise a GPS base station and co-located with the receiver elements a GPS subsidiary station for co-operation with the base station and provision of position data.

The sensor system may be movable relative to a transmitter to be located, the base and subsidiary GPS stations being arranged to provide position data and the computer apparatus being arranged to subtract calculated phase differences from those of processed element signals for a series of sensor system positions.

The measuring means may be arranged to implement inertial navigation.

The system of the invention may incorporate at least three receiver elements disposed to define a plurality of measurement dimensions in which to locate a transmitter, and the receiver elements may be patch antennas.

In an alternative aspect, the present invention provides a method of locating a transmitter having the steps of:
a) providing two receiver elements responsive to incident radiation by generation of respective signals,
b) determining phase difference data for pairs of element signals,
c) measuring sensor system position in terms of position data;
d) determining transmitter position from phase difference data measured from processed element signals and calculated from trial transmitter locations,
characterised in that transmitter position is determined from magnitude or phase of at least one circular function of a differential between measured and calculated phase difference data.

Phase difference data may be determined for pairs of element signals by multiplying one signal of each pair in either case by a complex conjugate of the other to enable their phase difference to be measured: this may be implemented by:
a) mixing each signal of a pair with sine and cosine reference signals to determine in-phase and quadrature components,
b) multiplying each component of one signal by both components of the other to produce an in-phase component product, a quadrature component product and two products of in-phase and quadrature components,
c) adding the in-phase component product to the quadrature component product, and
d) subtracting one product of in-phase and quadrature components from the other.

Signals may be digitised during processing at a sampling rate prior to mixing with reference signals, the reference signals have a frequency of one quarter of the sampling rate, and mixing is implemented by multiplication of alternate samples by 0 and one other sample in four by −1.

Phase differences may be calculated for a plurality of possible transmitter locations and actual transmitter location determined from correlation between calculated and measured phase differences.

The at least one circular function may be at least one complex exponent. It may be a plurality of complex exponents, actual transmitter location being determined by producing a summation of exponents over a range of system positions and transmitter location being that associated with a predetermined magnitude or phase of this summation. Actual transmitter location may alternatively by determined by producing a plurality of summations of exponents over a range of system positions and corresponding to respective dimensions of transmitter location, multiplying the summations together to form a product and indicating transmitter location to be that corresponding to a predetermined magnitude or phase of this product.

Position data is provided by means of a GPS base station co-operating with a GPS subsidiary station co-located with the receiver elements.

The receiver elements may movable relative to a transmitter to be located, position data may be provided by base and subsidiary GPS stations and calculated phase differences may be subtracted from those of processed element signals for a series of sensor system positions.

The method may employ at least three receiver elements in the form of patch antennas disposed to define a plurality of measurement dimensions in which to locate a transmitter.

BRIEF DESCRIPTION OF THE DRAWINGS

In order that the invention might be more fully understood, embodiments thereof will now be described, by way of example only, with reference to accompanying drawing, in which.

DETAILED DISCUSSION OF EMBODIMENTS

Figure 1:
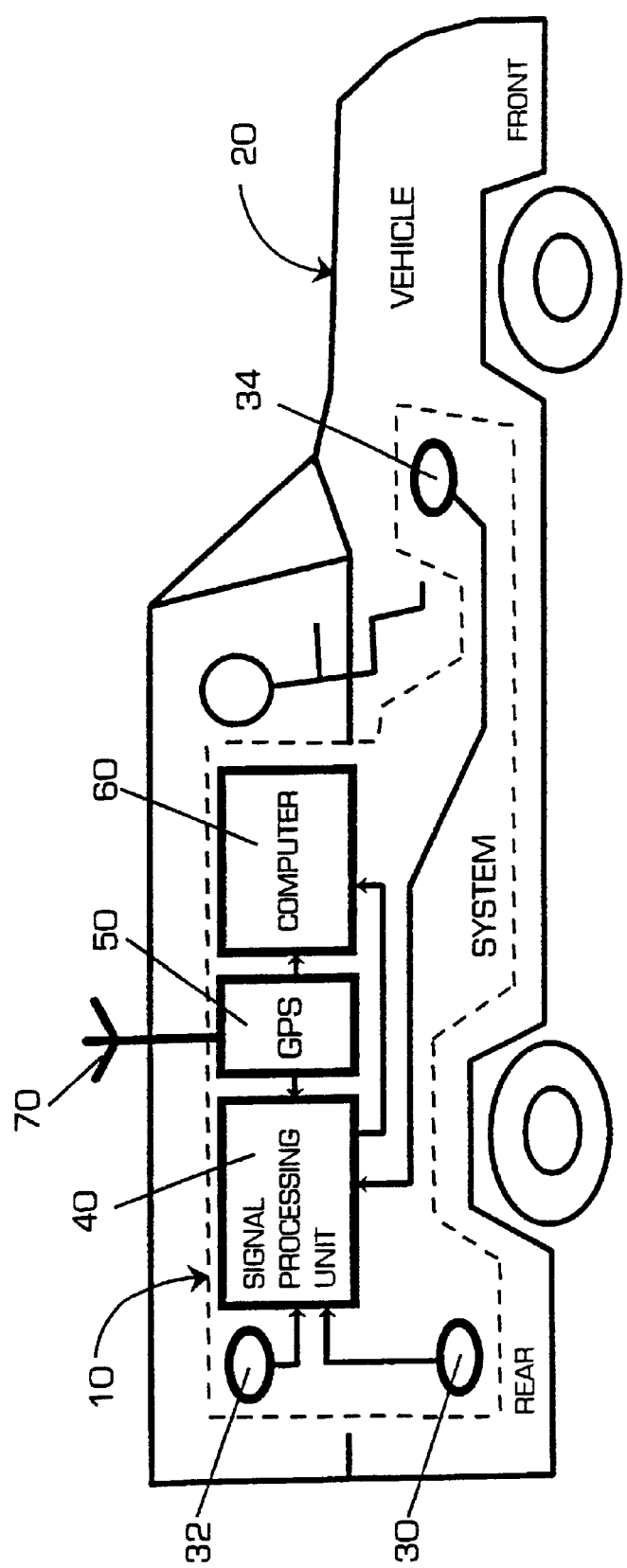
FIG. 1 is a schematic side elevation of a sensor system of the invention installed in a road vehicle.
Figure 2:
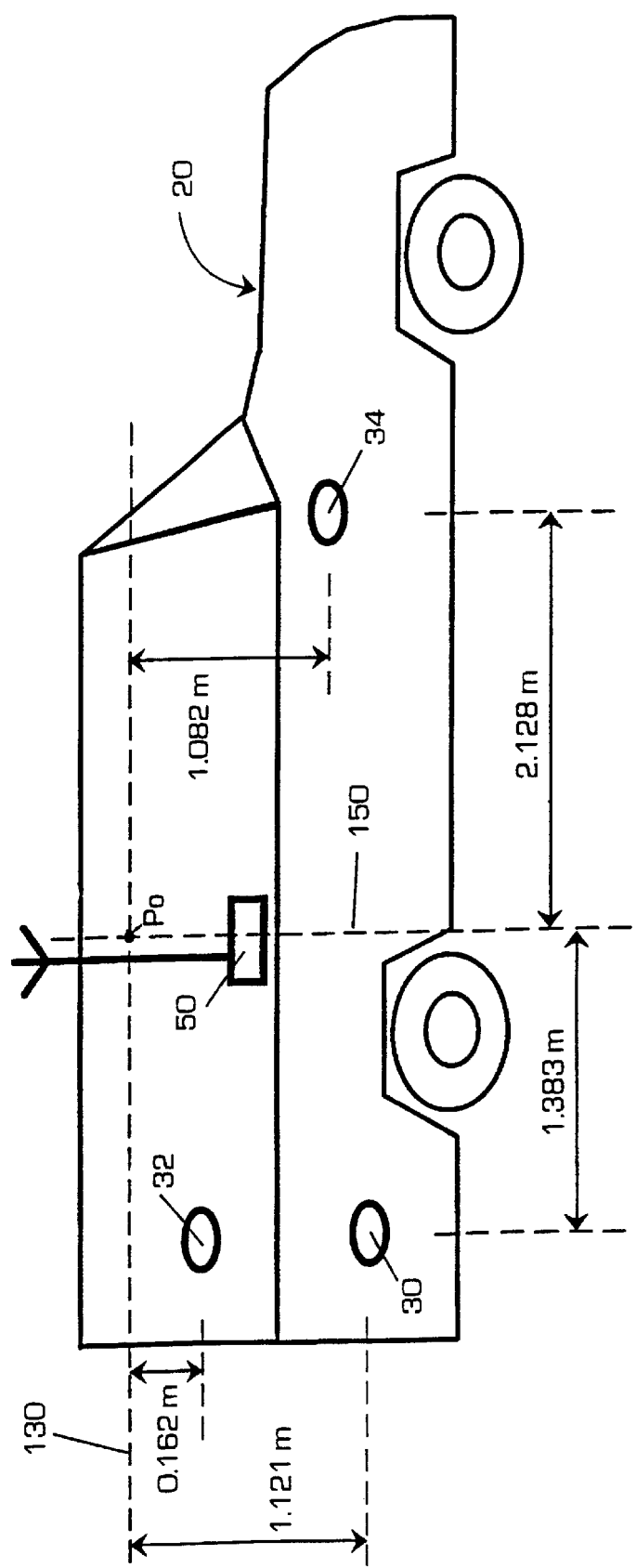
FIG. 2 shows antenna positions in FIG. 1.
Figure 3:
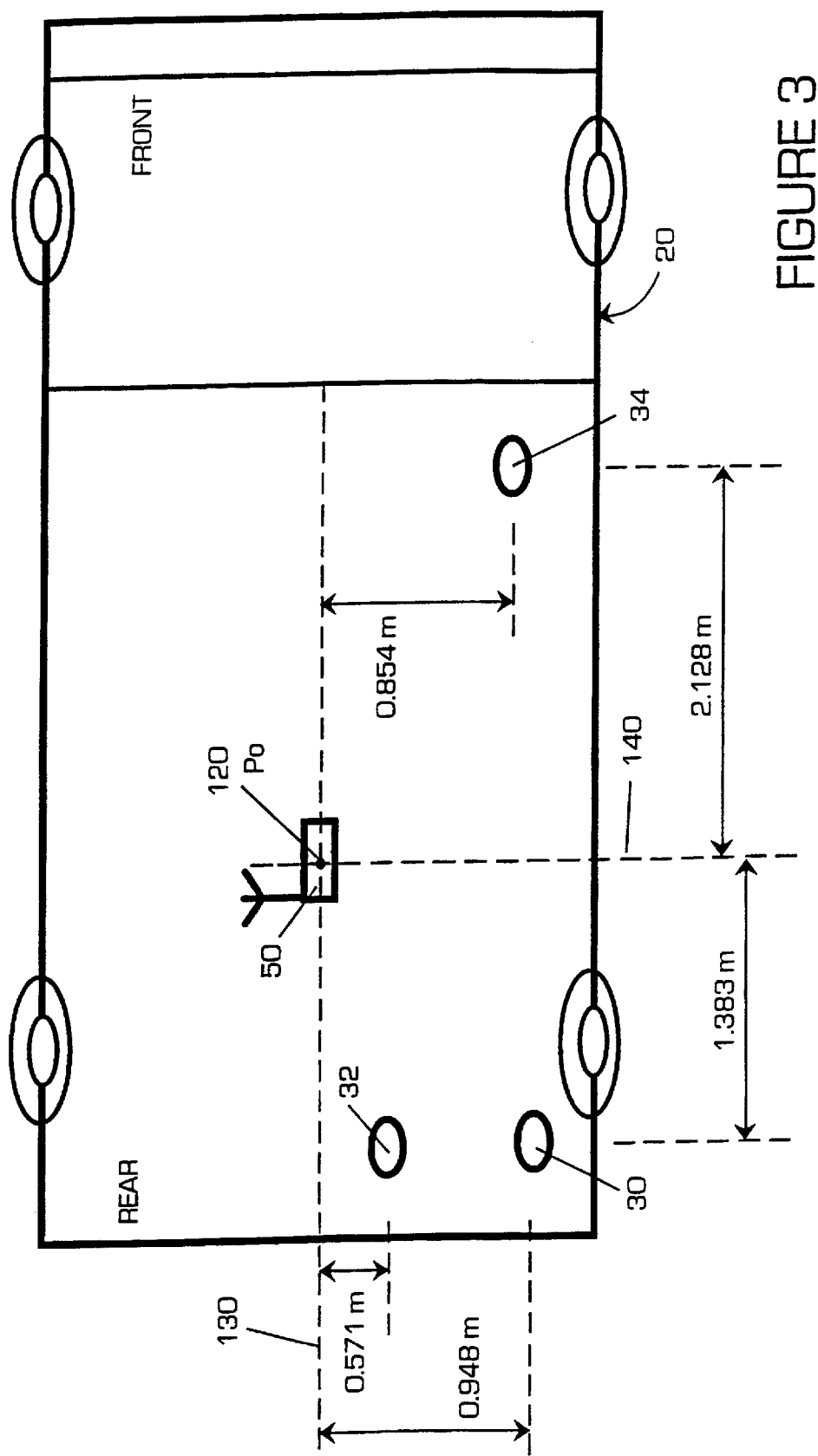
FIG. 3 is a plan view equivalent of FIG. 2.

Referring to FIGS. 1, 2 and 3, a sensor system 10 of the invention is installed in an estate car road vehicle 20. It incorporates three patch antennas 30, 32 and 34 mounted externally on one side of the vehicle 20, a signal processing unit 40, a navigation unit 50 and a computer 60. The navigation unit 50 is a satellite-based global positioning system (GPS) transceiver with an associated antenna assembly 70 mounted on a ladder rack on the vehicle roof The computer 60 is mounted in a forward position within the vehicle 20, whereas the processing and navigation units 40 and 50 are to its rear.

In operation, the navigation unit 50 provides the computer 60 with a positional reference for a point $P_o$ at the intersection of three Cartesian axes 130, 140 and 150, of which the first two are horizontal and the last vertical.

The antennas 30 to 34 are mounted on the vehicle 20 at distances of 1.121 m, 0.162 m, 1.082 m respectively from the plane of the first two axes 130 and 140. They are distant 1.383 m, 1.383 m and 2.128 m respectively from the plane of the second and third axes 140 and 150, and 0.948 m, 0.571 m and 0.854 m respectively from the plane of the first and third axes 130 and 150. They provide two antenna pairs 30/32 and 30/34, the antennas of each pair being spaced apart in a respective dimension to be searched for a transmitter.

The antennas 30 to 34 have patch dimensions of 97 mm (height)×100 mm (width)×3 mm (thickness). They have voltage standing wave ratios (VSVWR) between 1.23:1 and 1.25:1, and a receiving bandwidth of 18 MHz for a VSWR not exceeding 3:1. Each antenna 30 to 34 has a gain response of typically 6 dBi with a polar response characteristic having 70°-wide gain lobes in both E and H planes: here dBi indicates dB relative to an isotropic dipole.

Figure 4:
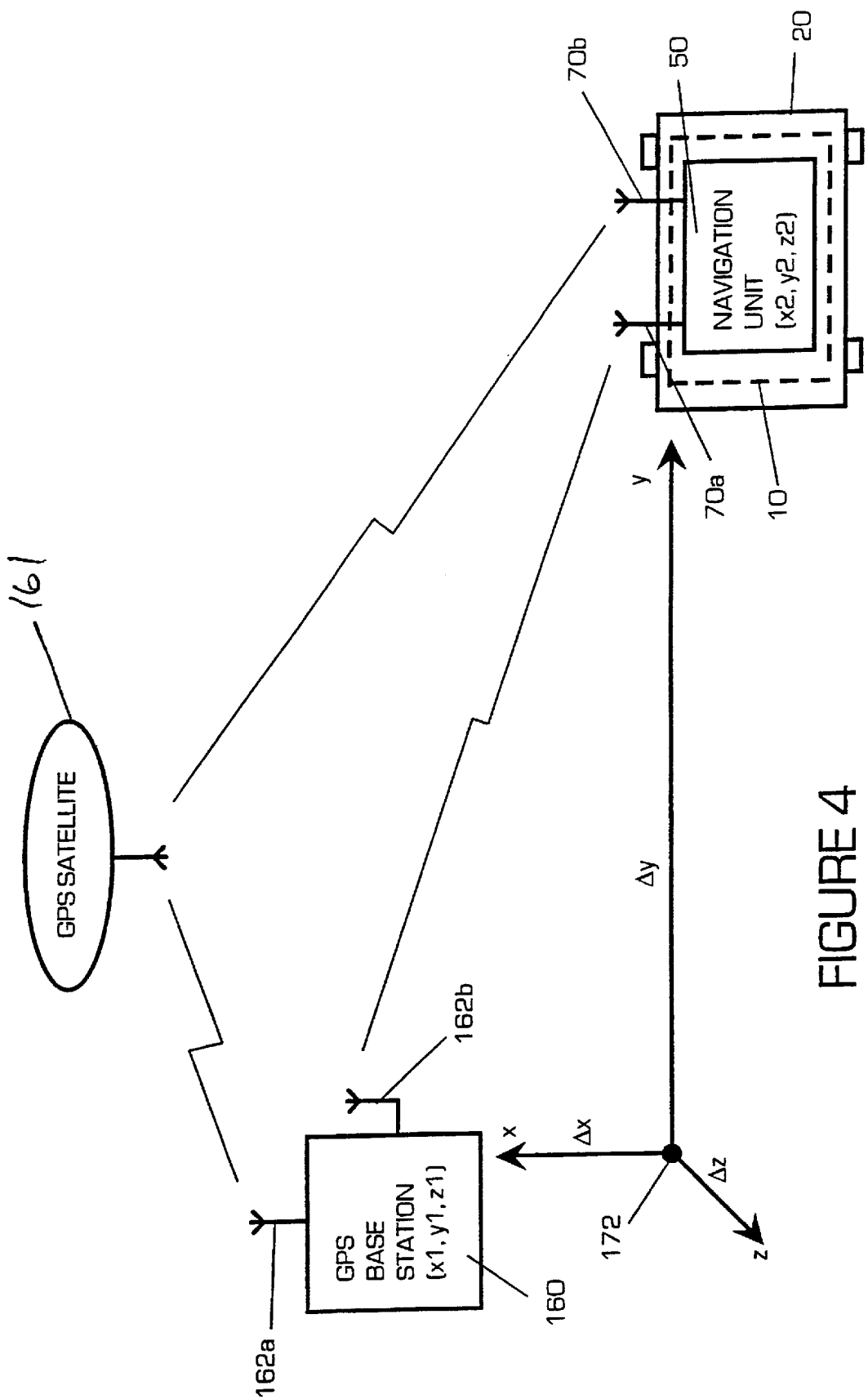
FIG. 4 illustrates the system of the invention communicating with a global positioning system (GPS) satellite and base station.

Referring now to FIG. 4, the system 10 is shown in communication with a global positioning system (GPS) base station 160 and a GPS satellite 161 for determination of position and from which vehicle yaw was inferred. It is a better option to include in addition an inertial navigation system because it determines attitude (pitch, yaw and roll) as well as position but it adds to expense. The antenna assembly 70 incorporates a backlink antenna 70a and a GPS antenna 70b communicating respectively with the GPS satellite 161 and a backlink antenna 162b of the base station, which also has a GPS antenna 162a. Positions are determined with respect to Cartesian axes 172, the base station 160 and the vehicle 20 being at (x1, y1, z1) and (x2, y2, z2) respectively.

In operation, the satellite 161 communicates with both the navigation unit 50 and the GPS base station 160, and the GPS base station 160 communicates with the navigation unit 50 via antennas 162b and 70a. This arrangement is a differential GPS system of known kind whose mode of operation will not be described in detail.

Figure 5:
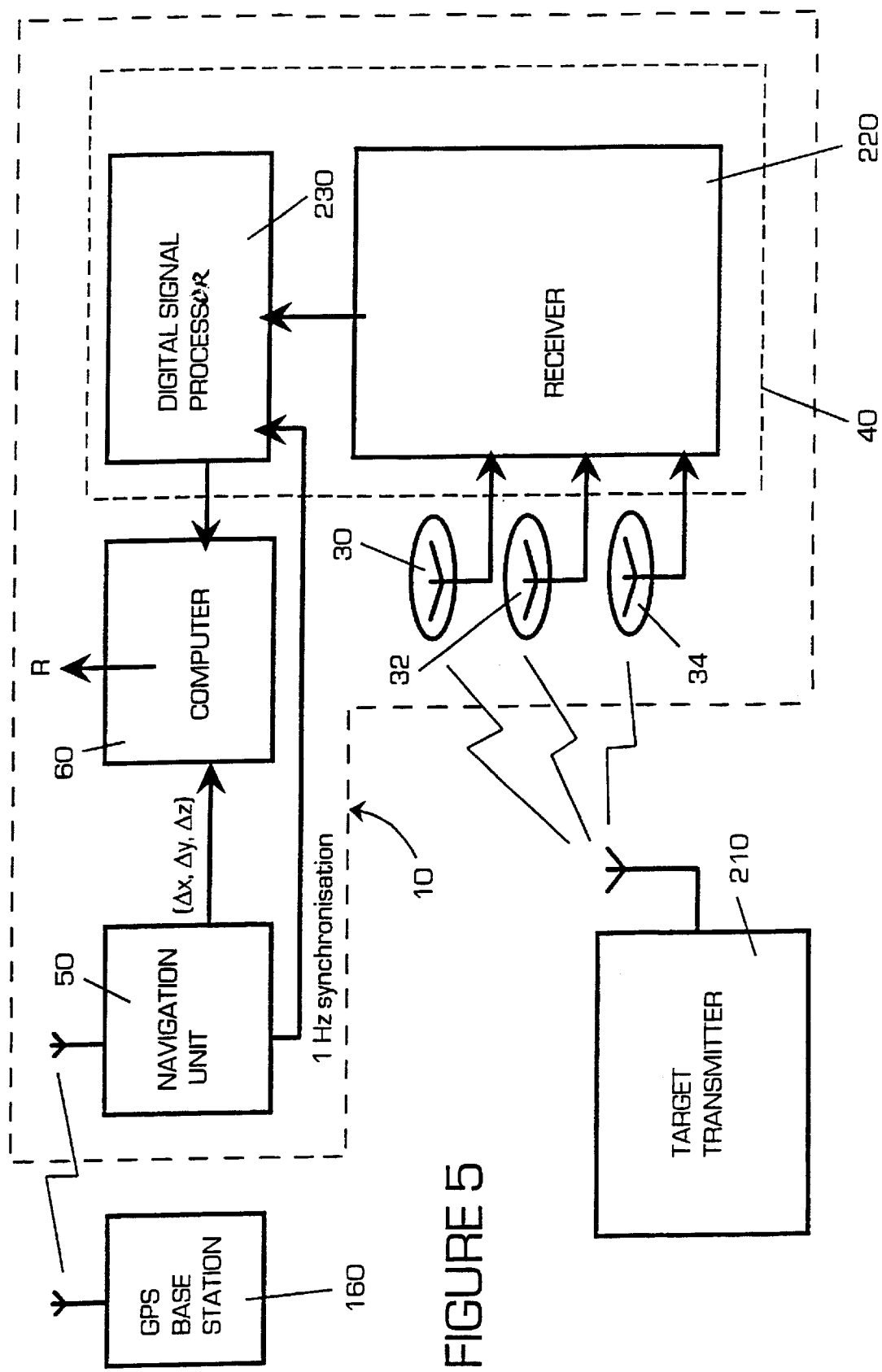
FIG. 5 illustrates the system of the invention detecting a remote transmitter.

Referring now to FIG. 5, the sensor system 10 is shown in more detail together with the GPS base station 160 and a transmitter 210 to be located. The transmitter 210 has a 1 GHz output signal with +20 dBm power. The processing unit 40 includes a receiver 220 connected to the antennas 30 to 34 and to a digital signal processor (DSP) 230, which is also connected to the navigation unit 50. The DSP 230 and the navigation unit 50 are connected to the computer 60.

In operation, the antennas 30 to 34 receive signals from the transmitter 210 and respond by supplying output signals to the processor 40 for processing and subsequent input to the computer 60. At the same time, the navigation unit 50 measures antenna positions relative to a positional reference provided by its GPS transceiver and the GPS base station 160 in combination. It provides positional data to the computer 60 at a rate of 1 sample every 3 seconds. The vehicle 20 moves relative to the transmitter 210, and the system 10 detects signals from the transmitter 210 at many locations, for example 3000 locations. The computer 60 processes the output from the processing unit 40 and the positional data from the navigation unit 50 to calculate the transmitter position relative to the system 10 for output at R.

The GPS base station 160 and the navigation unit 50 together, provide a positional reference for the system 10. This allows the positions of the antennas 30, 32 and 34 to be established to an accuracy of 10 cm. Without the GPS base station 160, ie using only a GPS station on the vehicle 20, this positional accuracy would only be ~30 m. It is desirable to search a volume of $10^6$ m$^3$ to an accuracy of ~2 m or better: a 30 m uncertainty is not acceptable.

The receiver 220 incorporates three signal processing channels (not shown) of like construction and connected to respective antennas 30, 32 and 34 by cables which are as nearly equal in length as possible to avoid affecting phase differences between antenna signals. Using standard superheterodyne techniques well known in radar and communications, each channel downconverts the 1 GHz signal from its associated antenna to generate a 5 kHz base-band signal. It uses two mixing stages and filters to achieve this, employing 978.6 MHz first local oscillator (LO) and a 21.395 MHz second LO. This is conventional technology and will not be described further. The need or otherwise for frequency downconversion depends on the magnitude of the transmitter frequency and the speed of processing circuitry: downconversion can be omitted if the former is sufficiently low and/or the latter sufficiently high.

The three signal processing channels together provide three base-band channel output signals each with a centre frequency of 5 kHz; they are referred to as Ch1, Ch2 and Ch3 and are associated with antennas 30, 32 and 34 respectively. As will be described later in more detail, the system 10 determines the phase differences between the Ch1, Ch2 and Ch3 output signals for a number of positions of the vehicle 20 relative to the transmitter 210. Because the absolute position of the vehicle 20 is known from its navigation unit 50, the absolute position of the transmitter 210 can be determined as will be described later.

The DSP 230 receives as input signals the Ch1, Ch2 and Ch3 output signals and a 5 Hz GPS data trigger or timing signal from the navigation unit 50. It incorporates two like processing circuits each obtained by reconfiguring a commercially available signal processing circuit as will be described. It calculates phase differences between these signals for use in the computer 60 for azimuthal and elevation calculations of transmitter position. It processes coherently in the sense that phase difference information contained in the signals J1 and J2 is preserved and processed to become computer accessible for subsequent determination. It processes the Ch1, Ch2 and Ch3 signals to determine their in-phase and quadrature components in each case, and then processes the components to determine phase difference and amplitude product. This is carried out for signal pairs Ch1/Ch2 and Ch1/Ch3, Ch1 being used twice.

Figure 9:
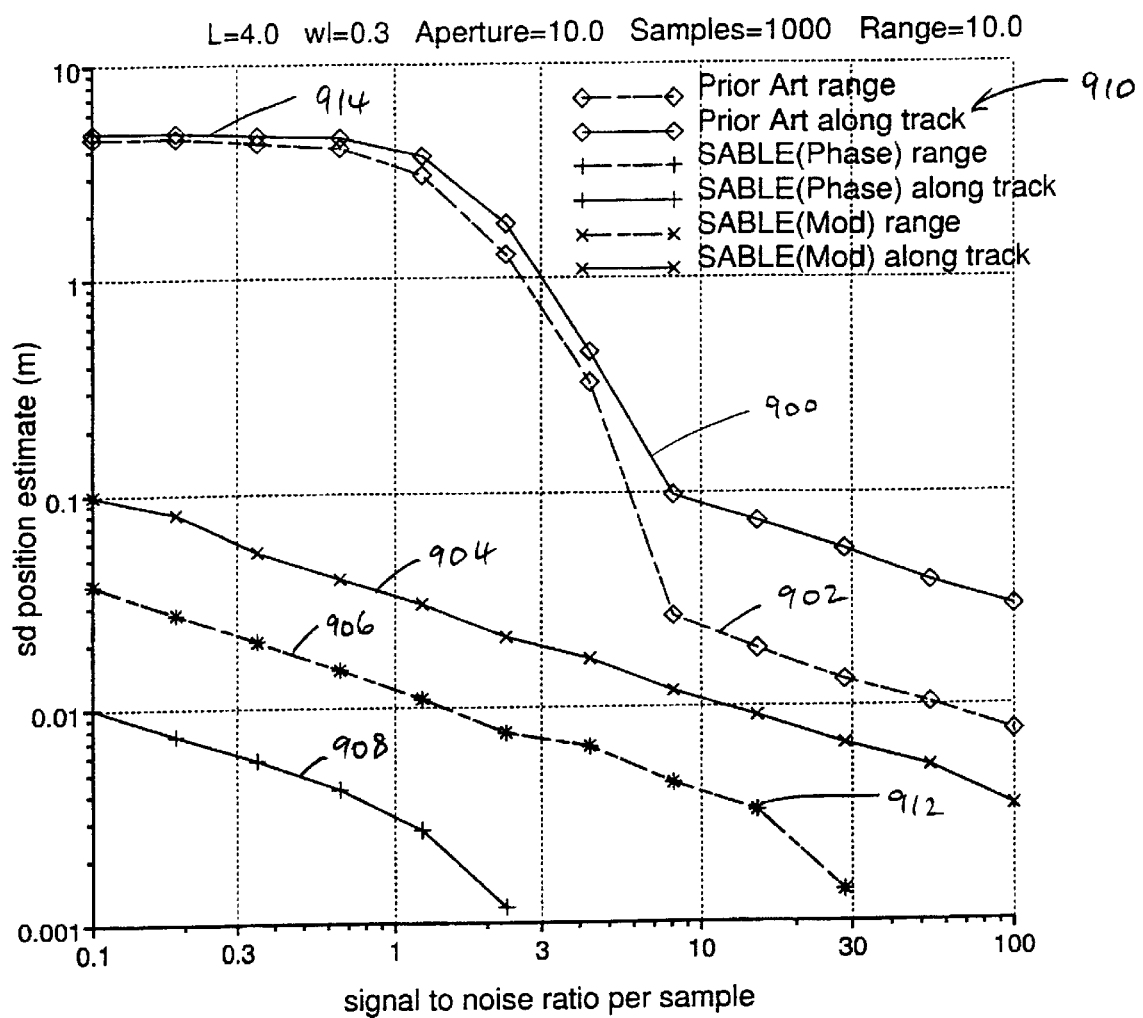
FIG. 9 compares prior art location accuracy with that of the invention.

FIG. 9 shows a circuit 500 of which there are two in the DSP 230. It is configured by programming a general-purpose circuit No ADSP 2181 manufactured by Analogue Devices Inc. It comprises both analogue and digital circuits and is controlled by a 20 MHz clock. It receives two analogue input signals J1 and J2, these being Ch1 and Ch2 for one of the two circuits and Ch1 and Ch3 for the other. The circuit 500 has two signal channels indicated by suffixes a and b to reference numerals. Apart from an additional function of signal inversion in channel b, the channels have like functions and like-referenced components except for suffixes, which will be omitted when describing both channels. As previously mentioned and as will be described in more detail later, the circuit 500 processes the signals J1 and J2 coherently in that it preserves their phase information relative to one another; it transforms them in such a way that their phase difference can be isolated and determined directly. At 600 the signals J1 and J2 are amplified and digitised at a sampling frequency of 48,000 samples per second (48 kHz) giving digital data streams D1 and D2; the latter are low-pass filtered at 604 to reduce noise (cut-off frequency 10 kHz) producing filtered data streams E1 and E2 respectively. J1 and J2 have a relative phase difference of ψ and can be expressed by:

$$J1 = A_1 \cos \omega_1 t \qquad (1)$$

$$J2 = A_2 \cos(\omega_1 t + \varphi) \qquad (2)$$

Sine and cosine (ie in quadrature) reference signals 608 and 612 of 12 kHz frequency are mixed with the filtered data streams E1 and E2 at 616 and 618: this produces mixed data streams I1p and Q1p for E1 and I2p and Q2p for E2; here I and Q indicate in-phase and quadrature components into which the streams E1 and E2 are decomposed by mixing. The reference signals are synchronised with and one quarter the frequency of the digital sampling frequency of 48 kHz mentioned above; in consequence there are four samples per cycle of each reference signal, ie the samples are separated by reference signal quarter cycles or π/2 phase angles. Moreover, the reference phase values at four successive samples are 0, π/2, π and 3π/2: the cosines for these are 1, 0, −1 and 0, and the sines are 0, 1, 0 and −1. Mixing with reference signals 608 and 612 therefore reduces to setting alternate samples to zero and inverting one other sample in four. It reduces required computation significantly. Digital processing in this way is superior to analogue for the usual reasons of time invariance, alignment etc. It is expressed by:

$$I1p = A_1\cos\omega_1 t\cos\omega_2 t = \frac{A_1}{2}(\cos(\omega_1+\omega_2)t + \cos(\omega_1-\omega_2)t)) \quad (3)$$

$$Q1p = A_1\cos\omega_1 t\sin\omega_2 t = \frac{A_1}{2}(\sin(\omega_1+\omega_2)t - \sin(\omega_1-\omega_2)t)) \quad (4)$$

$$I2p = A_2\cos(\omega_1 t + \varphi)\cos\omega_2 t = \quad (5)$$
$$\frac{A_2}{2}(\cos((\omega_1+\omega_2)t+\varphi) + \cos((\omega_1-\omega_2)t+\varphi))$$

$$Q2p = A_2\cos(\omega_1 t + \varphi)\sin\omega_2 t = \quad (6)$$
$$\frac{A_2}{2}(\sin((\omega_1+\omega_2)t+\varphi) - \sin((\omega_1-\omega_2)t+\varphi))$$

The four component streams I1p, Q1p, I2p and Q2p are high-pass filtered at 624 or 626 with a cut-off frequency of 17 kHz: this removes lower frequency components involving $\omega_1-\omega_2$, and produces filtered component streams I1, Q1, I2 and Q2 respectively:

$$I1 = \frac{A_1}{2}\cos(\omega_1+\omega_2)t \quad (7)$$

$$Q1 = \frac{A_1}{2}\sin(\omega_1+\omega_2)t \quad (8)$$

$$I2 = \frac{A_2}{2}\cos((\omega_1+\omega_2)t+\varphi) \quad (9)$$

$$Q2 = \frac{A_2}{2}\sin((\omega_1+\omega_2)t+\varphi) \quad (10)$$

These filtered data streams are mixed in pairs I1/I2, Q1/I2, Q1/Q2 and I1/Q2 at 640 or 642 producing mixed data streams I1.I2, Q1.I2, Q1.Q2 and I1.Q2.

$$I1.I2 = \frac{A_1 A_2}{4}\cos(\omega_1+\omega_2)t\cos((\omega_1+\omega_2)t+\varphi) \quad (11)$$
$$= \frac{A_1 A_2}{8}(\cos(2(\omega_1+\omega_2)t+\varphi)\cos\varphi)$$

$$Q1.I2 = \frac{A_1 A_2}{4}\sin(\omega_1+\omega_2)t\cos((\omega_1+\omega_2)t+\varphi) \quad (12)$$
$$= \frac{A_1 A_2}{8}(\sin(2(\omega_1+\omega_2)t+\varphi) + \sin\varphi)$$

$$Q1.Q2 = \frac{A_1 A_2}{4}\sin(\omega_1+\omega_2)t\sin((\omega_1+\omega_2)t+\varphi) \quad (13)$$
$$= \frac{A_1 A_2}{8}(\cos\omega + \cos(2(\omega_1+\omega_2)t+\varphi))$$

$$I1.Q2 = \frac{A_1 A_2}{4}\cos(\omega_1+\omega_2)t\sin((\omega_1+\omega_2)t+\varphi) \quad (14)$$
$$= \frac{A_1 A_2}{8}(\sin(2(\omega_1+\omega_2)t+\varphi) - \sin\varphi)$$

The mixed data streams I1.I2 and Q1.Q2 are summed at 650a producing a summed data stream (I1.I2+Q1.Q2), which is converted at 658a into RS232 format to become an output K1. Similarly, the other mixed data streams Q1.I2 and I1.Q2 are summed at 650a after inversion of the latter at 654, ie effectively subtracting one from the other, and this produces a second summed data stream (Q1.I2–I1.Q2) converted at 658b into RS232 format to become the output K2; ie:

$$K1 = I1.I2 + Q1.Q2 \quad (15)$$
$$= \frac{A_1 A_2}{8}(\cos(2(\omega_1+\omega_2)t+\varphi) + \cos\varphi + \cos\varphi -$$
$$\cos(2(\omega_1+\omega_2)t+\varphi))$$
$$= \frac{A_1 A_2\cos\varphi}{4}$$

$$K2 = Q1.I2 - I1.Q2 \quad (16)$$
$$= \frac{A_1 A_2}{8}(\sin(2(\omega_1+\omega_2)t+\varphi) + \sin\varphi - \sin(2(\omega_1+\omega_2)t+\varphi) +$$
$$\sin\varphi)\omega_2)t+\varphi) + \sin\varphi)$$
$$= \frac{A_1 A_2\sin\varphi}{4}$$

Figure 6:
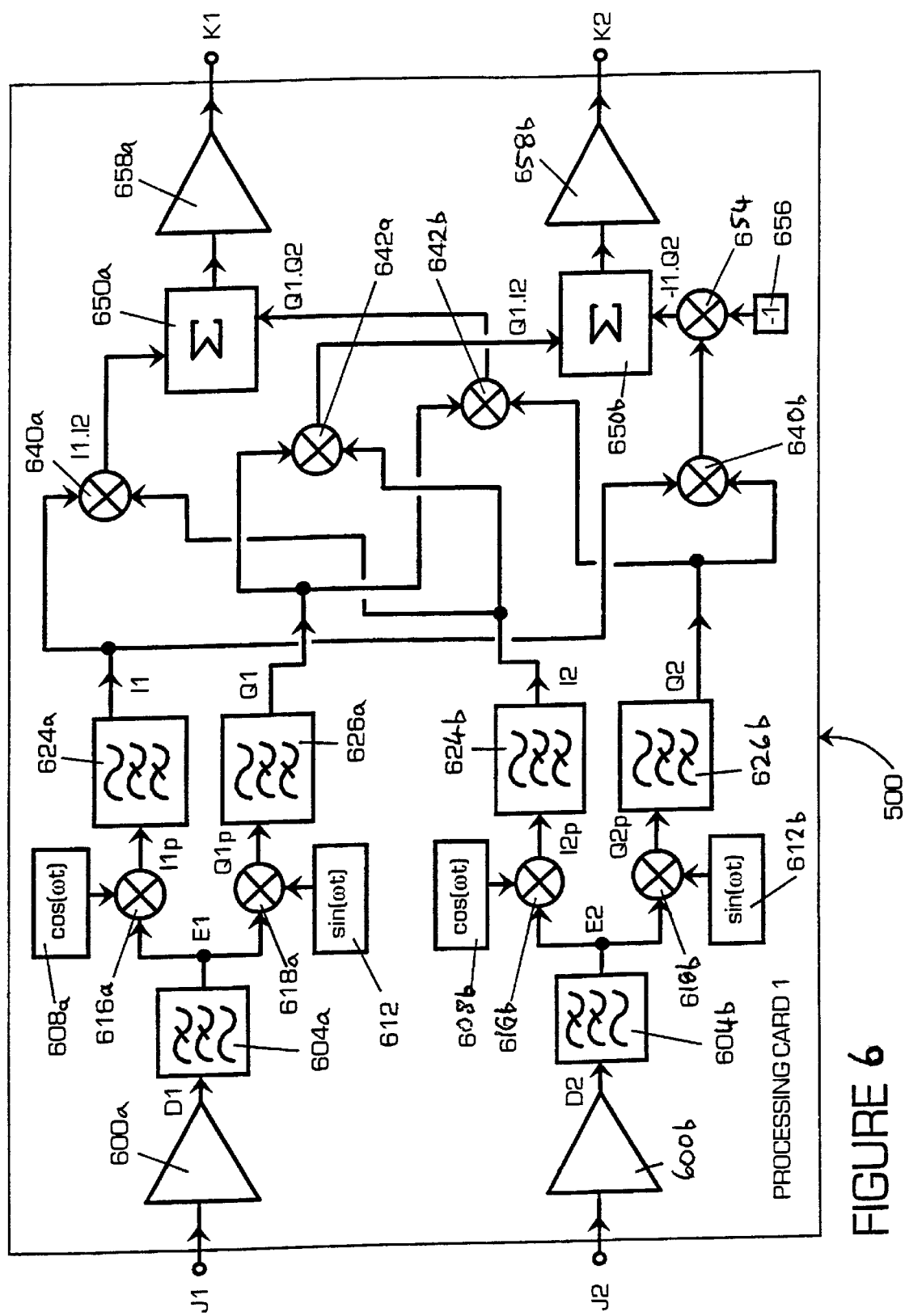
FIG. 6 is a phase processing circuit two of which are incorporated in the system of the invention shown in FIG. 5.

The operations of mixing at 640/642 and summing at 650 implements multiplication of the contents of channel a in FIG. 6 by the complex conjugate of channel b's contents, giving outputs from which, the required phase difference can be obtained. This process corresponds to coherent mixing or multiplication of a signal from one antenna 30 by the complex conjugate of a signal. from another, ie 32 or 34, the coherence being effectively encoded as a complex output of the multiplication.

As alternatives to the circuit 500 approach, fast Fourier transforms or Hilbert transforms are possible options but would either be inefficient or. would produce non-perfect I/Q balance with phase offsets with transmitter frequency drift. The circuit 50 produces the desired output using cheap, small, easily available components and lends itself to ease of calibration as will be described later. It also enables results to be obtained very rapidly.

Phasing signals K1 and K2 incorporating phase sample information are clocked from the circuit 500 to the computer 60 in response to its internal clock (not shown) controlling analogue to digital conversion at 600. They are asynchronous with position data from the navigation system 50 and need to be associated with an appropriate vehicle position at which their corresponding antenna output signals were obtained. To do this a timing mark signal is fed from the GPS system to. the circuit 500 for onward transmission to the computer 60 and marking the timing of successive K1/K2 values. An individual timing mark is synchronous to the time a respective position calculation is made in the GPS unit. The GPS system gives position every 0.2 second: to improve this position/time resolution, interpolation is used to associate K1/K2 values with appropriate vehicle positions intermediate successive GPS positions where necessary. K1/K2 timing in each case is compared with GPS position timing and K1/K2 position is adjusted reflect the occurrence of the former between two of the latter. The computer 60 stores data in chronological order on disk for the whole of the vehicle path and subsequently processes it to yield transmitter position as will be described.

The computer 60 derives the phase difference $\psi$ between the two signals J1 and J2 from the ratio of Equation (10) to Equation (9) and the product of their magnitude from the square root of the sum of the latters' squares, ie:

$$\varphi = \tan^{-1}\left(\frac{K2}{K1}\right) = \tan^{-1}\left(\frac{\sin\varphi}{\cos\varphi}\right) \quad (17)$$

$$M = \sqrt{[K1^2 + K2^2]} = \left(\frac{A_1 A_2}{4}\right)\sqrt{(\sin^2\varphi + \cos^2\varphi)} = \frac{A_1 A_2}{4} \quad (18)$$

The computer 60 calculates the phase difference $\psi$ between signals Ch1 and Ch2 for vertically separated antennas 30 and 32, and that between signals Ch1 and Ch3 for horizontally separated antennas 30 and 34: these correspond respectively to transmitter elevation (z axis position) and azimuth (xy plane position) relative to the vehicle 20. The computer 60 stores each successive system or vehicle position and two respective phase measurements. It is not in fact essential to evaluate Equation (18) for M, it being possible to use the phase difference ψ only to locate a transmitter as will be described later. Use of M in addition can improve accuracy.

The navigation unit 50 and the GPS base station 160 operate together to provide a GPS positional reference for the vehicle 20 with better than 1 m absolute accuracy on the earth's surface, much superior to 30 m accuracy obtainable from GPS navigation satellites. The position of the base station 160 is a fixed reference point and the transmitter 210 is located relative to it.

Figure 7:
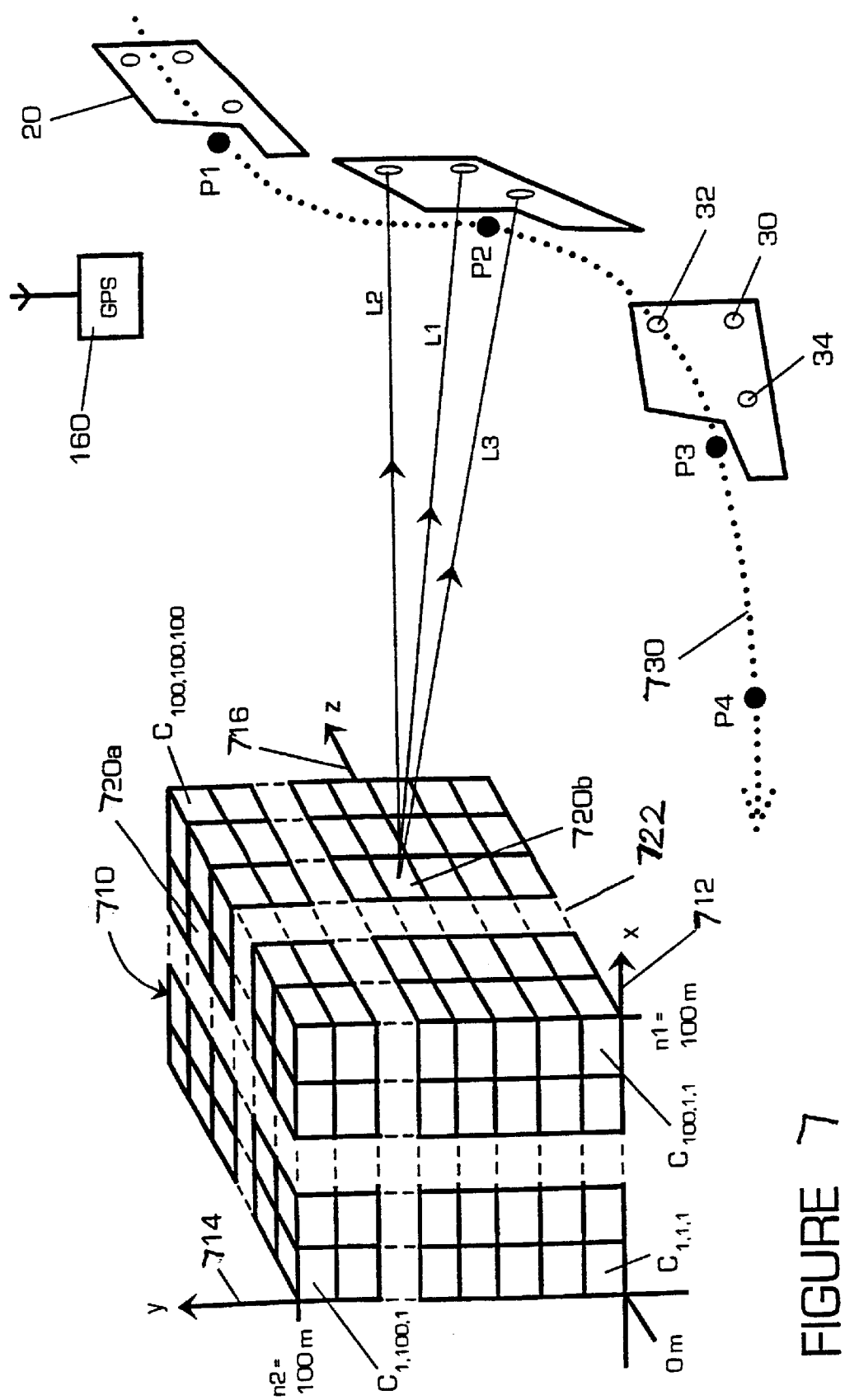
FIG. 7 illustrates operation of the invention in searching a volume for a transmitter.

Referring now to FIG. 7, the vehicle 20 is shown searching a cubic volume 710 of side length 100 m and defined with reference to x, y and z Cartesian axes 712, 714 and 716 respectively. The volume 710 consists of $10^6$ cubic cells such as 720a and 720b each of side length 1 m. To permit illustration, many cells are omitted and their positions are indicated by chain lines such as 722. Each cell is represented by $C_{ijk}$, i, j and k having values 1 to 100 and indicating cell position relative to axes 712 to 716. The vehicle 20 passes along a path 730 through a sequence of locations P1 to P4 at each of which measurements are made, ie Pq with q=1 to 4.

To locate the transmitter 210 in the volume 710, as will be described later in more detail, the computer 60 calculates differentials between phase differences of received antenna signals Ch1 to Ch3 and expected phase differences calculated for trial positions of a transmitter; an expected phase difference in elevation for a hypothetical transmitter located in a cell $C_{ijk}$ is represented by $\Delta\theta_{e,Pq,ijk}$, and $\Delta\theta_{a,Pq,ijk}$ is the equivalent in azimuth. The transmitter 210 has a high probability of being within a cell $C_{ijk}$ if expected phase differences $\Delta\theta_{e,Pq,ijk}$ and $\Delta\theta_{a,Pq,ijk}$ repeatedly give a good match to corresponding measured phase differences $\Delta\theta_{e,Pq}$ and $\Delta\theta_{a,Pq}$ at successive vehicle positions P1 etc.

At each vehicle position, the computer 60 calculates a phase difference which would be expected for signals received at the system 10 from a transmitter in a cell $C_{ijk}$ as follows. In FIG. 7, L1, L2 and L3 are distances from a cell 720b to respective antennas 30, 32 and 34, and have integral and fractional wavelength parts given by:

$$L1 = (n_1 + \delta_1)\lambda \quad (19)$$

$$L2 = (n_2 + \delta_2)\lambda \quad (20)$$

$$L3 = (n_3 + \delta_3)\lambda \quad (21)$$

where λ is transmitter signal radiation wavelength, $n_1$, $n_2$ and $n_3$ are integers and $\delta_1$, $\delta_2$ and $\delta_3$ are fractions.

Elevation phase difference $\Delta\theta_{e,Pq,ijk}$ is calculated by the computer 60 by subtracting Equation (19) from Equation (20) to obtain path difference and multiplying by 2π/λ, $$ie: \Delta\theta_{e,Pq,ijk} = 2\pi(\delta_2 - \delta_1) \quad (22)$$

Azimuthal phase difference $\Delta\theta_a$ is calculated similarly from Equations (19) and (21), $$ie: \Delta\theta_{a,Pq,ijk} = 2\pi(\delta_3 - \delta_1) \quad (23)$$

The positions of the base station 160 and of the vehicle 20 relative to it are known, and the absolute positions of cells in the volume 710 are known, so the computer 60 calculates L1, L2 and L3 by geometry and from them expected phase differences.

In exponential form, operations performed in the DSP 230 on the signals Ch1, Ch2, Ch3 are as follows:

$$Ch1(t) \cdot Ch2^*(t) = B_1 B_2 e^{j\Delta\theta_{e,Pq}} \quad (24)$$

$$Ch1(t) \cdot Ch3^*(t) = B_1 B_3 e^{j\Delta\theta_{a,Pq}} \quad (25)$$

Where:

$$Ch1(t) = B_1 e^{j\omega t} \quad (26)$$

$$Ch2(t) = B_2 e^{j(\omega t + \Delta\theta_{e,Pq})} \quad (27)$$

$$Ch3(t) = B_3 e^{j(\omega t + \Delta\theta_{a,Pq})} \quad (28)$$

$B_1$, $B_2$ and B3 are signal amplitude coefficients, * denotes a complex conjugate and other terms have their conventional meanings. Multiplication of Ch1 by the complex conjugate of Ch2 and Ch3 in Equations (29) and (30) respectively in the DSP 230 results in removal of the time dependent ω term leaving the measured elevation and azimuthal phase differences $\Delta\theta_{e,Pq}$ and $\Delta\theta_{a,Pq}$ as required.

The navigation unit 50 provides the computer 60 with locations $D_{P1}$ etc for successive positions P1, P2 etc. At each position, the computer 60 records all relevant data, ie location $D_{P0q}$, measured phase differences $\Delta\theta_{e,Pq}$ and $\Delta\theta_{a,Pq}$, and expected phase differences $\Delta\theta_{e,Pq,ijk}$ and $\Delta\theta_{a,Pq,ijk}$ calculated for all possible transmitter locations in the search volume 710; after the system has completed its movement along the trajectory 730, the computer 60 analyses this data by investigating the degree of correlation between expected and measured phase differences to find a best match indicating a cell containing a transmitter. In the expressions for Ch1(t).Ch2*(t) and Ch1(t).Ch3*(t) above, $B_1B_2$ and $B_1B_3$ (M in Equation (18)) are arbitrarily set to unity for convenience; ie this amplitude information is not used in the present example to reduce computation, although it would improve accuracy and would be used if this were required. The computer 60 produces expressions $e^{j\Delta\theta_{e,Pq}}$ and $e^{j\Delta\theta_{a,Pq}}$ representing signal products in complex number or circular function form based on the measured phase differences $\Delta\theta_{e,Pq}$ and $\Delta\theta_{a,Pq}$ for locations $D_{P1}$ etc. It repeats this for expected phase differences $\Delta\theta_{e,Pq,ijk}$ and $\Delta\theta_{a,Pq,ijk}$ to give expected signal products $e^{j\Delta\theta_{e,Pq,ijk}}$ and $e^{j\Delta\theta_{a,Pq,ijk}}$.

To correlate expected and measure phase difference, the computer 60 generates elevation and azimuth match coefficients $Ne_{Pq,ijk}$ and $Na_{Pq,ijk}$ for each of the cells $C_{ijk}$; the match coefficients are produced in each case by multiplying together the two respective signal products obtained from measured and expected phase differences, ie:

$$Ne_{Pq,ijk} = e^{j\Delta\theta_{e,Pq}} e^{-j\Delta\theta_{e,Pq,ijk}} = e^{j(\Delta\theta_{e,Pq} - \Delta\theta_{e,Pq,ijk})} \quad (29)$$

$$Na_{Pq,ijk} = e^{j\Delta\theta_{a,Pq}} e^{-j\Delta\theta_{a,Pq,ijk}} = e^{j(\Delta\theta_{a,Pq} - \Delta\theta_{a,Pq,ijk})} \quad (30)$$

Unlike the prior art of U.S. Pat. No. 5,835,060, 2π discontinuities in phase angle do not give serious difficulty in Equations (29) and (30) because the exponents therein are circular functions: ie a small error which alters a phase difference from nearly $2\pi$ to just above zero remains a small error with only a small effect on the exponent.

In order to locate a transmitter, one could seek a maximum value in either $Ne_{Pq,ijk}$ or $Na_{Pq,ijk}$ at a single system position providing data for one elevation dimension or two azimuth dimensions respectively. However, greater accuracy is obtained by combining data: to implement this, for each cell $C_{ijk}$, the elevation match coefficients $Ne_{Pq,ijk}$ for all Q system positions (ie P1 to P4) are summed to provide a trajectory elevation match coefficient $Me_{ijk}$, and likewise azimuth equivalents $Na_{Pq,ijk}$ and $Ma_{ijk}$, ie:

$$Me_{ijk} = \sum_{q=1}^{Q} Ne_{Pq,ijk} \qquad (31)$$

$$Ma_{ijk} = \sum_{q=1}^{Q} Na_{Pq,ijk} \qquad (32)$$

$Me_{ijk}$ and $Ma_{ijk}$ each contain measured and expected transmitter phase histories in the form of exponents of differentials between corresponding phase differences. Here again one could seek a maximum value in either $Me_{ijk}$ or $Ma_{ijk}$ in order to locate a transmitter, but greater accuracy may be obtained by combining them: to implement this, their moduli or magnitudes are multiplied together for each cell to give an overall match indicator $V_{ijk}$, ie:

$$V_{ijk} = |Me_{ijk}||Ma_{ijk}| \qquad (33)$$

The transmitter position is within a cell $C_{ijk}$ associated with a match indicator $V_{ijk}$ of greatest value. This is a single pass determination: ie there is no necessity for the construction of $V_{ijk}$ to be followed by iterative least squares fitting. $V_{ijk}$ could possibly be constructed from the complex values of $Me_{ijk}$ and $Ma_{ijk}$ instead of their moduli, but the result may be undesirably sensitive to small errors in phase.

$Me_{ijk}$ or $Ma_{ijk}$ may be employed to calibrate the system 10. Each is a complex number, but should have a zero value of its imaginary part (zero phase) when its magnitude is a maximum: this is because the $Ne_{Pq,ijk}$ and $Na_{Pq,ijk}$ values they contain will all have zero exponents; ie measured and expected phase differences will be equal and their differentials zero ignoring noise and minor inaccuracy in transmitter position off-centre of a cell. If $Me_{ijk}$ or $Ma_{ijk}$ does not in fact have zero phase at maximum magnitude, it indicates that the system 10 has introduced a phase error due to unequal antenna cable lengths, unmatched receiver chains etc: if so the phase difference error at the maximum of one of these quantities may be measured and removed ,from later phase measurements by the computer in a calibration operation. Such a calibration is likely to remain valid for a substantial length of time, because each pair of antennas and associated processing circuitry are in the same environment: any drift is likely to be common to both antennas and therefore to cancel out.

It is possible to modify the approach illustrated in FIG. 7 using multiple values of resolution, ie firstly a coarse resolution search to localise. the transmitter to a region of a few cells or a large cell of say 3 m side length, followed by one or more finer resolution searches to increase accuracy. This reduces the number of computer calculations required. It is also possible to use super resolution as described in U.S. Pat. No. 4,963,877 to resolve multiple sources of signals which are too close together to be resolved according to the Rayleigh criterion.

The system 10 evaluates all possible target positions within a search volume to a prearranged resolution by comparing the phase history of received antenna signals with an expected transmitter phase history obtained by calculation. This reduces the possibility of false alarms because a whole environment is assessed. Multiple targets if any may become apparent, if necessary using super resolution as aforesaid. An automated search may be used.

Figure 8:
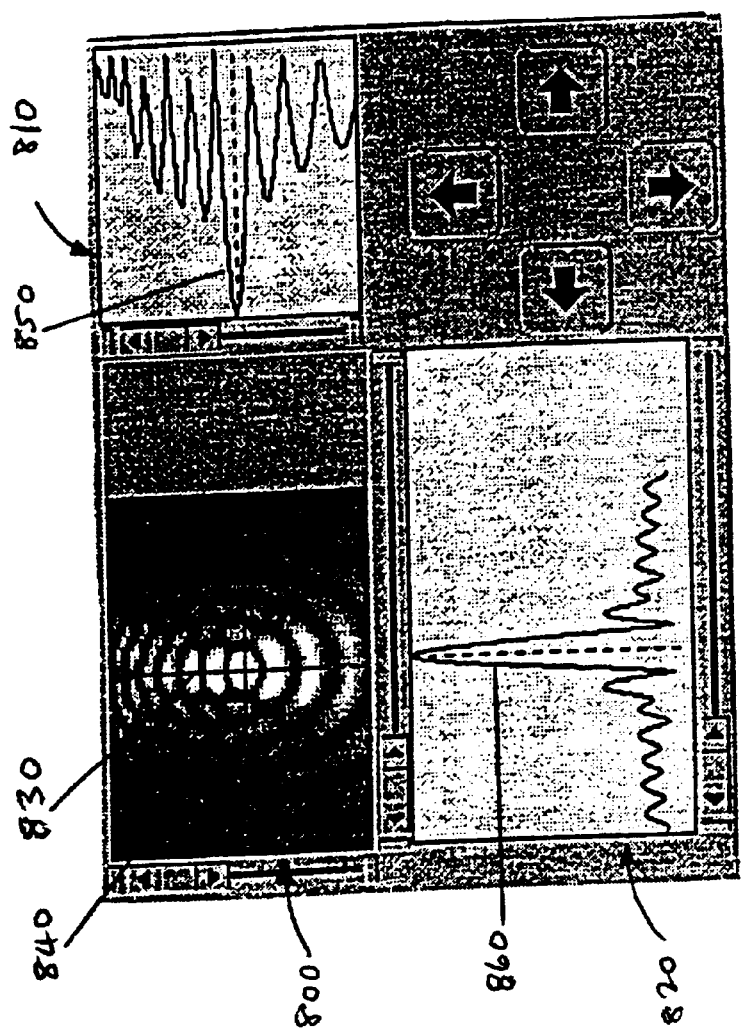
FIG. 8 is a graphical illustration of transmitter location probability.

Referring now to FIG. 8, there is shown a two-dimensional plot 800 of the variation in trajectory azimuth match coefficient $Ma_{ijk}$ referred to above, ie transmitter location indicator in azimuth over one layer of cells (cells having the same value of j index or y axis position and different values for ik index pairs). Graphs 810 and 820 indicate variation in location probability along two orthogonal reference lines 830 and 840 within the plot 800.

The plot 800 has bright and dark fringes associated respectively with greater and lesser probabilities of finding the transmitter 210 in corresponding cells. Graphs 810 and 820 have generally central peaks 850 and 860 respectively defining a probability maximum and indicating a transmitter location.

FIG. 9 displays graphs 900 to 908 of standard deviation (sd) in position estimates as a function of signal to noise ratio for a prior art location system of U.S. Pat. No. 5,835,060 and for the present invention (referred to as "SABLE"). The graphs have logarithmic axes, and were obtained from like computer simulations of the prior art and the invention. The simulations involved two antennas separated by a distance L of 4 m, the wavelength was 0.3 m (1 GHz) and the aperture (distance moved by the system 10) was 10 m, ie±5 m with respect to a central position which is broadside on to a transmitter to be located; the transmitter was at a range of 10 m from the locating system in each case, and 1,000 measurements were made, ie one per cm of distance moved by the system 10. At 910 a key is given to the graphs 900 to 908: here "along track" refers to measurement position errors in a dimension parallel to the location system movement direction, and "range" is the equivalent for errors in a dimension.orthogonal to this generally towards the transmitter to be located. "Phase" in parenthesis indicates that the peak 850/860 in the trajectory azimuth match coefficient $Ma_{ijk}$ 800 (transmitter location probability) was obtained by determining where the phase of this function went through zero; "Mod" in parenthesis indicates that this peak was obtained by determining the position of the maximum of the modulus of $Ma_{ijk}$. Graphs 900 and 902 show range and along track results for the prior art and graphs 904 to 908 those for the present invention.

Graphs 904 and 908 are both standard deviation along track but determined from modulus and phase respectively, the latter being superior because it has the lower deviation. Graph 906 is in fact two coincident graphs superimposed on one another, ie the graphs of standard deviation in range determined from modulus and phase respectively; this is indicated by points such as 912 each comprising "x" (Mod) overwritten by "+" (Phase). The fact that these two graphs are identical indicates there is no accuracy advantage in choosing either phase or modulus to determine location.

The graphs 900 to 908 show that the prior art measurement uncertainty or standard deviation (sd) is considerably worse (larger) than that of the invention for all values of signal to noise. Moreover, prior art graphs 900 and 902 are actually optimistic, because they level off at a region 914 simply because the computer simulation used a finite search volume which limited the maximum uncertainty irrespective of signal to noise ratio. Even with this levelling off, the maximum prior art error is over 40% whereas that for the invention is 1%. Although these absolute values should be treated with caution because they are simulated, it is correct to infer that the invention exhibits markedly better accuracy (lower uncertainty) than the prior art.

Although the system 10 has been described as incorporating patch antennas for simplicity and cheapness, any other antenna or indeed receiving waveguide can be used provided signal phase at reception can be determined from it.

In a dense urban environment a transmitter signal may undergo reflections before reception, and measured phases derived the system 10 may be unreliable. This is a well known multipath problem. The system 10 should therefore sample radiation from the transmitter 210 frequently from a variety of different directions in order to collect a large enough sample of data to resolve uncertainty. Sampling a transmitter signal from many different directions tends to reduce problems with multipath effects and to improve location reliability.

The system 10 may incorporate inertial navigation sensors such as gyroscopes and accelerometers for monitoring instantaneous orientation and position of the vehicle 20 in combination with a GPS reference provided by the base station 160 and the GPS receiver in the navigation unit 50. This provides an advantage that the system 10 can counteract inaccuracies in measured phases differences $\Delta\theta_{e,Pq}$ and $\Delta\theta_{a,Pq}$.

A simplified version of the system 10 would use only two antennas 30, 34 and would be largely limited to locating a transmitter in a two-dimensional field, ie cells $C_{ijk}$ with a single j index value or y axis position. This requires less computation. However, even with two antennas, with appropriate platform motion, it is possible to obtain location information in all three spatial dimensions.

The system 10 may be adapted to search a larger more remote volume. It may be mounted in an aircraft for searching for transmitters in an underlying scene. Alternatively, it might search a smaller nearby volume such as a building. It may also be adapted for operation in sonar by replacing the antennas 30 to 34 with sonar transducers and arranging for the transmitter 210 and the signal processing unit 40 to operate at a sonar frequency such as 20 kHz. It might be mounted on a satellite for locating transmitters of unknown origin.

What is claimed is:

1. A sensor system for transmitter location incorporating:
    a) two receiver elements (30, 34) responsive to incident radiation by generation of respective signals,
    b) a processing system (40) for determining phase difference data for pairs of element signals,
    c) means (50) for measuring sensor system position in terms of position data;
    d) computer apparatus (60) for determining transmitter position from phase difference data measured from processed element signals and calculated from trial transmitter locations,
characterised in that the computer apparatus (60) is arranged to locate transmitters from magnitude or phase of circular functions of differentials between measured and calculated phase difference data.

2. A sensor system according to claim 1 characterised in that the processing system (40) is arranged to process a pair of element signals or a pair of frequency downconverted signals equivalent thereto by multiplying one signal of each pair in either case by a complex conjugate of the other to enable their phase difference to be measured.

3. A sensor system according to claim 2 characterised in that the processing system (40) is arranged to determine phase difference by:
    a) mixing each signal of a pair with sine and cosine reference signals to determine in-phase and quadrature components,
    b) multiplying each component of one signal by both components of the other to produce an in-phase component product, a quadrature component product and two products of in-phase and quadrature components,
    c) adding the in-phase component product to the quadrature component product, and
    d) subtracting one product of in-phase and quadrature components from the other.

4. A sensor system according to claim 3 characterised in that the processing system (40) is arranged to digitise signals at a sampling rate prior to mixing with reference signals, the reference signals have a frequency of one quarter of the sampling rate, and mixing is implemented by multiplication of alternate samples by 0 and one other sample in four by −1.

5. A sensor system according to claim 1 characterised in that the circular functions are complex exponents.

6. A sensor system according to claim 5 characterised in that the computer apparatus (60) is arranged to determine actual transmitter location by summing exponents over a range of system positions and to indicate transmitter location from the magnitude or phase of this summation.

7. A sensor system according to claim 5 characterised in that the computer apparatus (60) is arranged to determine actual transmitter location by producing summations of exponents over a range of system positions, to multiply the summations together to form a product and to indicate transmitter location as that corresponding to a predetermined magnitude or phase of this product.

8. A sensor system according to claim 1 characterised in that the measuring means comprises a GPS base station (160) and co-located with the receiver elements a GPS subsidiary station (50) for co-operation with the base station (160) and provision of position data.

9. A sensor system according to claim 8 characterised in that:
    a) it is movable relative to a transmitter (210) to be located,
    b) the base and subsidiary GPS stations (50, 160) are arranged to provide position data,
    c) the computer apparatus (60) is arranged to subtract calculated phase differences from those of processed element signals for a series of sensor system positions.

10. A sensor system according to claim 1 characterised in that the measuring means (50) is arranged to implement inertial navigation.

11. A sensor system according to claim 1 characterised in that it incorporates at least three receiver elements (30, 32, 34) disposed to define a plurality of measurement dimensions in which to locate a transmitter (210).

12. A system according to claim 1 characterised in that the receiver elements are patch antennas (30, 32, 34).

13. A method of locating a transmitter having the steps of:
    a) providing two receiver elements (30, 34) responsive to incident radiation by generation of respective signals,
    b) determining phase difference data for pairs of element signals,
    c) measuring sensor system position in terms of position data;

d) determining transmitter position from phase difference data measured from processed element signals and calculated from trial transmitter locations, characterised in that transmitter position is determined from magnitude or phase of at least one circular function of a differential between measured and calculated phase difference data.

14. A method according to claim 13 characterised in that determining phase difference data for pairs of element signals is carried out by multiplying one signal of each pair in either case by a complex conjugate of the other to enable their phase difference to be measured.

15. A method according to claim 14 characterised in that determining phase difference data is carried out by:
   a) mixing each signal of a pair with sine and cosine reference signals to determine in-phase and quadrature components,
   b) multiplying each component of one signal by both components of the other to produce an in-phase component product, a quadrature component product and two products of in-phase and quadrature components,
   c) adding the in-phase component product to the quadrature component product, and
   d) subtracting one product of in-phase and quadrature components from the other.

16. A method according to claim 15 characterised in that signals are digitised during processing at a sampling rate prior to mixing with reference signals, the reference signals have a frequency of one quarter of the sampling rate, and mixing is implemented by multiplication of alternate samples by 0 and one other sample in four by −1.

17. A method according to claim 13 characterised in that calculated phase differences are produced for a plurality of possible transmitter locations and actual transmitter location is determined from correlation between calculated and measured phase differences.

18. A method according to claim 13 characterised in that the at least one circular function is at least one complex exponent.

19. A method according to claim 18 characterised in that the at least one complex exponent is a plurality of complex exponents, actual transmitter location is determined by producing a summation of exponents over a range of system positions and indicating transmitter location to be that corresponding to a predetermined magnitude or phase of this summation.

20. A method according to claim 18 characterised in that the at least one complex exponent is a plurality of complex exponents, actual transmitter location is determined by producing a plurality of summations of exponents over a range of system positions and corresponding to respective dimensions of transmitter location, multiplying the summations together to form a product and indicating transmitter location to be that corresponding to a predetermined magnitude or phase of this product.

21. A method according to claim 13 characterised in that position data is provided by means of a GPS base station (160) co-operating with a GPS subsidiary station (50) co-located with the receiver elements.

22. A method according to claim 20 characterised in that:
   a) the receiver elements (30, 32, 34) are movable relative to a transmitter (210) to be located,
   b) position data are provided by base and subsidiary GPS stations (50, 160),
   c) calculated phase differences are subtracted from those of processed element signals for a series of sensor system positions.

23. A method according to claim 13 characterised in that position data are obtained using inertial navigation.

24. A method according to claim 13 characterised in that it employs at least three receiver elements (30, 32, 34) disposed to define a plurality of measurement dimensions in which to locate a transmitter (210).

25. A method according to claim 13 characterised in that the receiver elements (30, 32, 34) are patch antennas.

* * * * *